United States Patent
Pinard et al.

[11] Patent Number: 6,075,851
[45] Date of Patent: Jun. 13, 2000

[54] ORGANIZATION CHART BASED CALL INFORMATION ROUTING

[75] Inventors: Deborah L. Pinard; Ronald A. Evans, both of Kanata, Canada

[73] Assignee: Mitel Corporation, Kanata, Canada

[21] Appl. No.: 09/283,197

[22] Filed: Apr. 1, 1999

Related U.S. Application Data

[63] Continuation of application No. 08/613,522, Mar. 11, 1996.

[51] Int. Cl.[7] .......................... H04M 1/64; H04M 15/00; H04M 1/00; H04M 3/00
[52] U.S. Cl. ..................... 379/199; 379/67.1; 379/120; 379/157; 379/243
[58] Field of Search ..................... 379/67.1, 83, 88.22, 379/93.12, 100.15, 120, 157, 199, 201, 210, 243

[56] References Cited

U.S. PATENT DOCUMENTS

| | | | |
|---|---|---|---|
| 5,533,110 | 7/1996 | Pinard et al. | 379/201 |
| 5,703,940 | 12/1997 | Sattar et al. | 379/201 |
| 5,761,288 | 6/1998 | Pinard et al. | 379/201 |
| 5,812,533 | 9/1998 | Cox et al. | 370/259 |
| 5,864,614 | 1/1999 | Farris et al. | 379/207 |
| 5,892,819 | 4/1999 | Stumer | 379/211 |

FOREIGN PATENT DOCUMENTS 0 795 991 A1  9/1997  European Pat. Off. .

*Primary Examiner*—Krista Zele
*Assistant Examiner*—Allan Hoosain
*Attorney, Agent, or Firm*—Pascal & Associates

[57] ABSTRACT

A method of routing calls, messages or information (call routing) comprising storing in a memory a database representing a relationship or organization roles, including names of persons filling the roles and call directory numbers associated with the roles, in response to a request to complete a call to a particular directory number associated with one of the roles, looking up in the database a directory number associated with one of the roles, and processing the call as if the call were directed to the further directory number.

10 Claims, 4 Drawing Sheets

| NAME | EXT # |
|---|---|
| BILL | 1600 |
| HELEN | 1601 |
| JOE | 1602 |
| FRED | 1603 |
| JOHN | 1604 |
| MARY | 1605 |
| DAVID | 1606 |
| ⋮ | |

FIG. 3

| CALL SCREENING - MARY |
|---|
| ALLOWED CALLERS |
| 1603 OR MY BOSS |

FIG. 4

ORGANIZATION CHART BASED CALL INFORMATION ROUTING

This application is a continuation of U.S. application Ser. No. 08/613,522 filed Mar. 11, 1996.

FIELD OF THE INVENTION

This invention relates to the communication field, and in particular to a method of call routing in a communication system such as a telephone switching system.

BACKGROUND TO THE INVENTION

Users of telephone switching systems in organizations typically have features which are provided by the switching systems, and as one of the features retain a directory of speed call numbers. When the persons who are in certain roles in the organization change, each member of the organization which retains the persons who have changed roles in a directory must update the directory. In addition, as a member of the organization changes, the special features can change.

For example, assume that a member of the organization has call screening as a feature. That member has set up the call screening feature to only allow calls to be completed to the member's telephone if the call is from that person's boss. The member would enter the boss' telephone number (e.g. extension number) into a call screening list associated with that member. Now if the boss is moved to a new roll, and retains the same telephone number, the call screening feature number of the member's new boss would have to be entered.

Similarly, in the event that the member wants to send an electronic mail message to each member of a group, the name and associated number of each member would have to be looked up in a directory, and the message sent to each of the identified numbers. In the event the members of the group change, the member would have to modify the directory for each changed, added or deleted member.

Entering of the change data by each member of the organization is prone to error, and takes significant unproductive time.

SUMMARY OF THE INVENTION

The present invention is a method of call routing which uses a data base which identifies members of the organization by roles, rather than merely names and numbers. Preferably the identification is based on an organization chart. The organization chart contains or uses the data from a directory, and a correlation is made between roles in an organization and features such as the routing of calls, electronic mail, etc. Features such as call screening, electronic mail mailing lists, etc. are set up based on roles, rather than directory numbers, so that when the organization chart is changed, the identities of persons dealt with by the features are automatically updated.

In accordance with an embodiment of the invention, a method of routing calls, messages or information (call routing) in a local area network communication switching system is comprised of storing in a memory a database representing an organization chart having a plurality of relationship organization roles, including a list of names of persons filling the roles and call directory numbers associated with the persons, storing in the database a list of alternate names and directory numbers associated with at least some of the roles, in response to a request to complete a call to a particular directory number associated with one of the roles, looking up in the database the list of alternate names and directory numbers and selecting an alternate directory number associated with the one of the roles, and processing the call as if the call were directed to the alternate directory number.

BRIEF INTRODUCTION TO THE DRAWINGS

A better understanding of the invention will be obtained by reading the description of the invention below, with reference to the following drawings, in which:

FIG. 1 is a block diagram illustrating a hardware architecture system for implementing the present invention, FIG. 2 is a representation of data stored in a database in accordance with an embodiment of the invention, FIG. 3 is a representation of other data stored in a database in accordance with an embodiment of the invention, FIG. 4 is a representation of still other data stored in a database in accordance with an embodiment of the invention FIG. 5 is a representation of a process in accordance with an embodiment of the invention, FIG. 6 is an illustration of a computer screen displaying a command used in another embodiment of the invention, FIG. 7 is a representation of a process in accordance with another embodiment of the invention, and FIG. 8 is a representation of other data stored in a database in accordance with another embodiment of the invention.

DETAILED DESCRIPTION OF PREFERRED EMBODIMENTS

Figure 1:
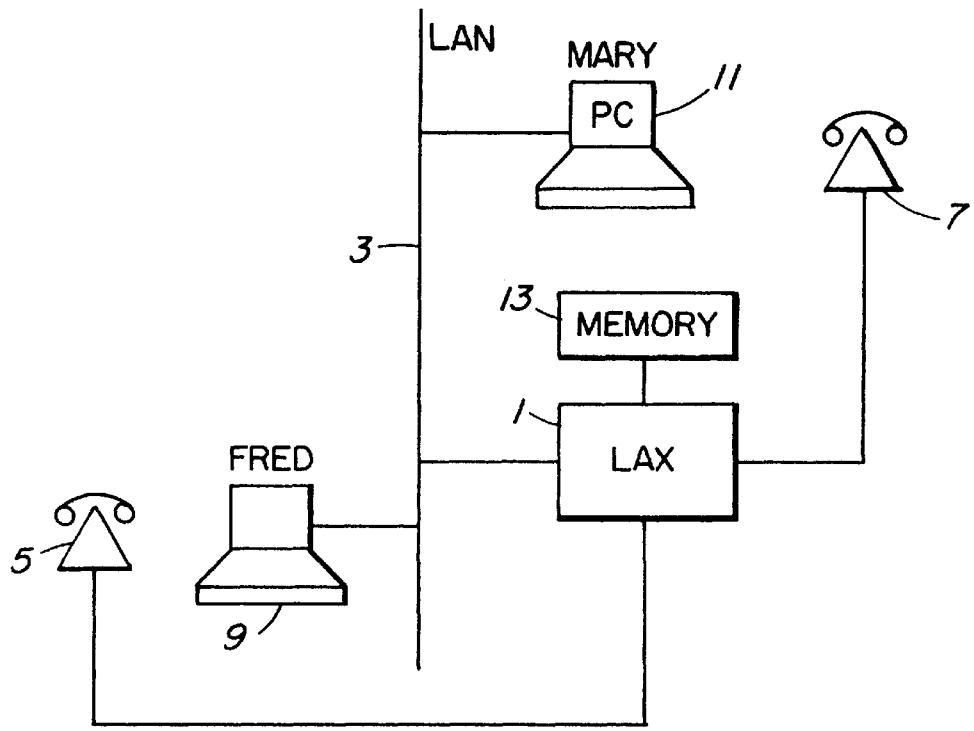

FIG. 1 illustrates basic elements of a hardware system architecture on which the present invention may be implemented. The system is described in U.S. patent application Ser. No. 339,463 filed Nov. 14, 1994 and entitled LOCAL AREA COMMUNICATIONS SERVER, and preferably operates using software agents in a manner as described in U.S. patent application Ser. No. 257,917 filed Jun. 10, 1994 and entitled ADAPTIVE COMMUNICATION SYSTEM and U.S. patent application Ser. No. 367,821 filed Jan. 3, 1995 and entitled ADAPTIVE COMMUNICATION SYSTEM, all of which are incorporated herein by reference. The present invention however is not limited to the structures and methods of operation described in these patent applications.

FIG. 1 reproduces pertinent parts of FIG. 1 of the aforenoted patent application Ser. No. 339,463, and shows a local area communication system (LAX) 1 connected to a local area network (LAN) 3. Various telephones 5 and 7 correspond to telephones 5 and 13 respectively of U.S. application Ser. No. 339,463. Personal computers 9 and 11 associated with telephone users correspond to computers 1A and 1B of the latter patent application. Each of the telephone-personal computer combinations is labeled with the name of a user, e.g. Fred and Mary, for better understanding of the description of the invention which follows.

Figure 2:
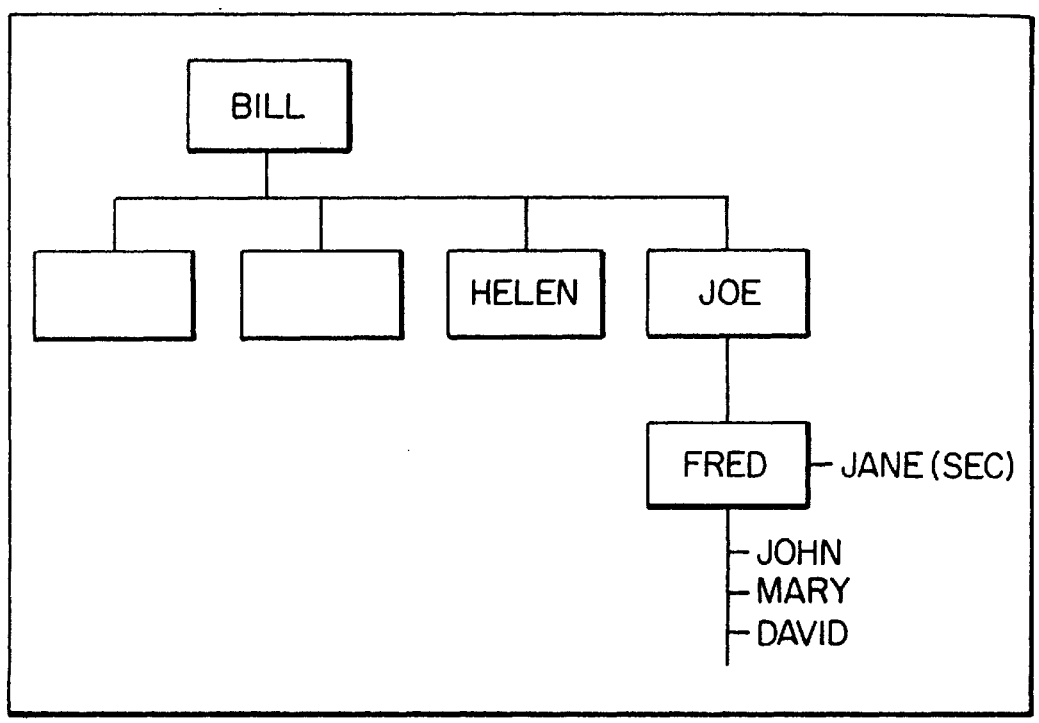

A memory 13 associated with the LAX stores a relational database of the following kind. The database contains an organizational chart 15 as shown in FIG. 2, which contains definitions of roles and associates them with names of individuals. What is meant by definitions of roles is relationships of reporting structures, identification of groups, etc. For example, in FIG. 2, both Helen and Joe are shown reporting to Bill, Fred reports to Joe, Jane is Fred's secretary, and the group comprising John, Mary and David report to Fred.

The database shown in FIG. 2 need not be in graphical form as shown, but can be in any database form that can store the relationships of the organization, such as the one shown. The database can store the title or identity of the role, in addition to the name of the incumbent.

The database should also store the telephone directory number of each of the persons in the organization chart, as shown in FIG. 3. Records are shown in the directory which correlates names in a first column and extension (directory) numbers in a second.

The database should also store feature data, as shown in FIG. 4. For example, Mary has a call screening feature, in which allowed callers (callers whose incoming calls are allowed to complete calls to Mary's telephone or computer) are identified. Mary has entered the extension number 1603 (which identifies Fred, and may be seen in the directory of FIG. 3), which is a specific line.

In accordance with an embodiment of the present invention, the callers can be identified by role, rather than by number. Thus when the organization changes, the database and in particular the organization chart in the database is updated, and as a result the features that identify a role rather than a person automatically cause the system to process an incoming call from, or an outgoing call to, a line to operate correctly with respect to the real intention of the user, without the user having to learn of the change, the details of the change and update each feature manually.

Mary has therefore also entered MY BOSS in the Allowed Callers list in the call screening feature stored in the database, which may be seen from the organization chart of FIG. 2 as identifying Fred. This means that whoever fills the role of Mary's boss (e.g. permanently or for the day) will have calls allowed through to Mary.

The above will become clearer from an understanding of some examples which follow.

Figure 5:
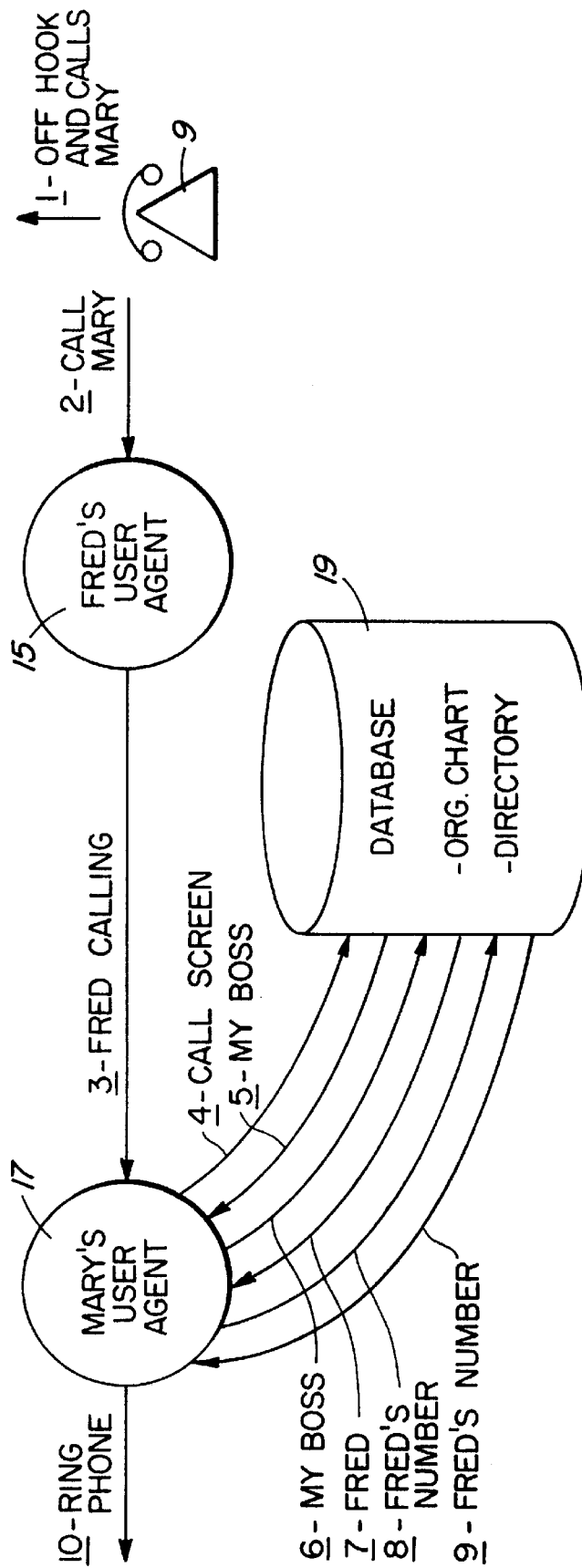

Turning to FIG. 5, which shows the flow of the process in accordance with an embodiment of the invention, assume that Fred goes off hook (step 1) and dials Mary. Fred's user agent 15 is informed (step 2). Fred's user agent 15 informs Mary's user agent 17 of the attempt to call Mary (step 3), including the identity number (e.g. extension number) of Fred.

Mary's user agent 17 checks call screening in the database 19 stored in memory 13 (step 4), which responds with the identities of all incoming calls which are allowed to complete calls to Mary's line. This list includes MY BOSS (step 5).

Mary's agent then looks up the identity of Mary's boss in the database (FIG. 2) (step 6), which returns the name "Fred" (step 7). Mary's agent then looks up the directory number of the identified Fred in the directory stored in the database (FIG. 3) (step 8), and receives it from the database (step 9), and matches it with the identity number of the calling party.

Upon finding a match between the identity number of the calling party and the identity number of Fred retrieved from the directory, Mary's agent passes the information to other agents of the switching system to allow the call to be completed to Mary.

If the identity number of the calling party does not match the retrieved number of Fred, Mary's user agent can instruct other agents of the switching system to complete the call to Mary's secretary, to a voicemail system, etc.

Thus for this example, entry of the number 1603 in the feature allowed caller list was redundant, and need not have been entered. It may be seen that should Mary's boss have been changed, with or without a new directory number, there is no need for Mary to check and possibly update her feature data, since the system would automatically route calls from her boss to her.

Assuming for example that Mary's boss is being changed for a week, due to Mary joining another group for a week, the database data shown in FIG. 2 would be changed to place Mary in a different line, for example reporting to Helen. The central database data shown in FIG. 3 would be changed, if necessary, to list Mary's new directory extension number. However Mary does not have to pay attention to her personal feature list data, since the system operates as described above to route calls from her new boss Helen to her new telephone line, and to block completion of other calls to her (other than calls from extension 1603 if that number is still in her personal feature database.

Figure 6:
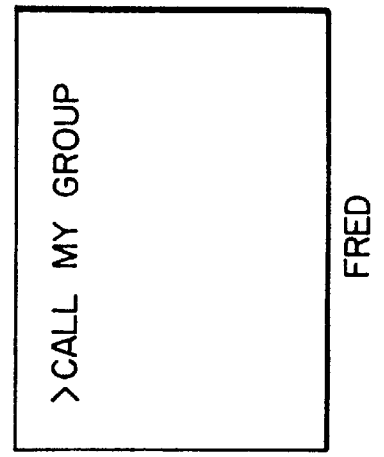

As another example, Fred may want to make telephone calls to each member of his group. Rather than having a list of the names of each member of his group and individually looking up the corresponding numbers, Fred can type a command into a computer-telephone interface (CTI) application program running on the LAX or in his personal computer, which for example is shown in FIG. 6 as ">Call My Group".

Figure 7:
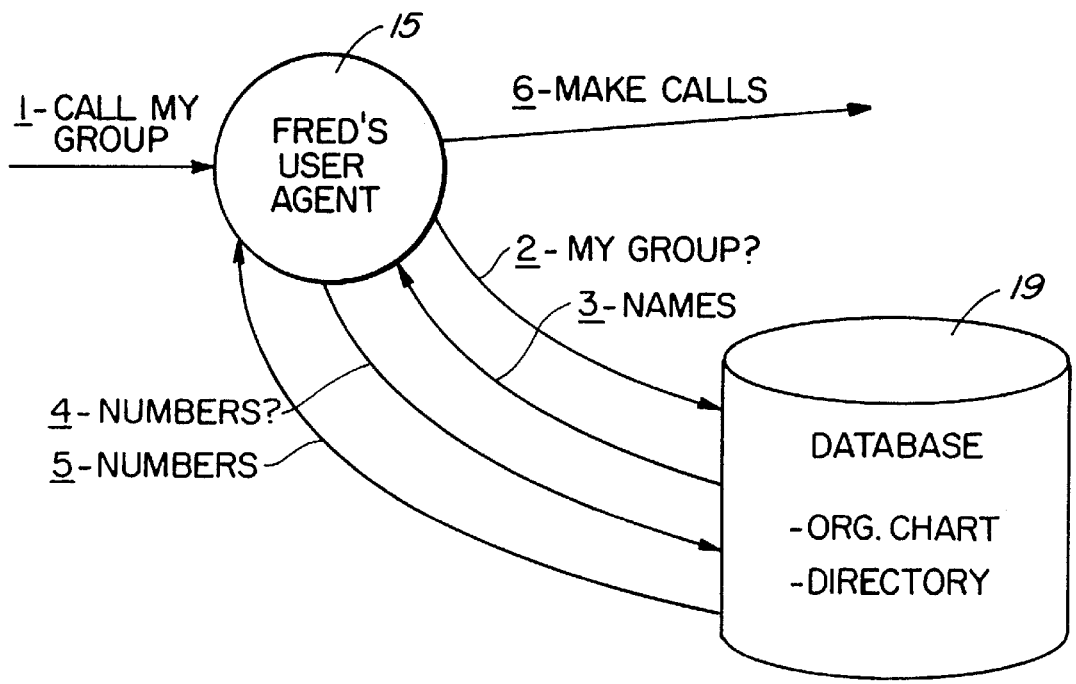

As shown in the process chart of FIG. 7, the command is received by Fred's user agent 15 (step 1). The user agent as a result looks up the names of all members of Fred's group in the database 19 (step 2), by consulting the organization chart (FIG. 2) stored in the database. The names of the members of Fred's group are then returned to Fred's agent 15 (step 3). Fred's agent then consults the database (FIG. 3) to obtain the directory numbers of each member of Fred's group, by looking up their names (step 4). The corresponding directory numbers are returned to the agent from the database (step 5). The names correlated to the directory numbers of all of the members of Fred's group can then be displayed on the screen of Fred's personal computer. Fred then can make calls to each or any of the members of his group (step 6).

It may be seen that by storage of the organization chart in the database, a user can automatically obtain the directory listings of everyone in the group, without having to remember the name of everyone in the group. For example, without the use of the present invention, a boss could accidentally forget the name of a new member of the group, or the existence or name of a temporary member, and the result could be a missed instruction, a missed meeting, information not being passed, etc.

In a similar manner, the list of members and their directory numbers returned as a result of Fred's request can be used to route electronic mail. Once the list is available to Fred, he can use his CTI application to send a mail message to all members of his group listed (or to particular single or plural members which he can indicate by selection from the display) at the same time.

Figure 8:
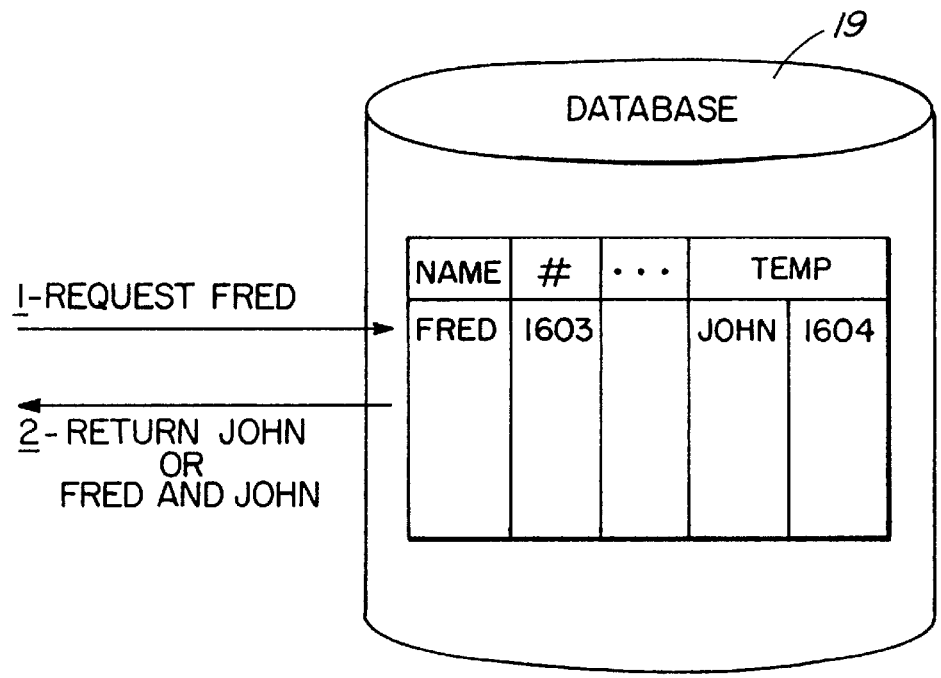

FIG. 8 illustrates another embodiment of the invention, in which the directory stored in the database is modified by the addition of fields identifying temporary replacements for various persons. In the example shown, "John" at extension 1604 is listed as temporarily replacing Fred. Thus when the directory in the database is being looked up for Fred's role directory number (or for Fred's directory number) (step 1), in the event the "temporary" field in Fred's directory record is filled in, either John's directory number is returned, or both Fred's and John's directory number.

This embodiment of returning Fred's substitute directory number can function when directory numbers are being looked up for information purposes, or during the processing of a call. For example, for an incoming call to Fred's role, the system agent can look up the database to determine Fred's directory number and receive John's temporary replacement directory number, and use that number, i.e. send that number to John's agent to complete the call intended for Fred, to John.

The role identities are thus used both in the centralized database usable by all subscribers (e.g. FIGS. 2 and 3) as well as in individual database sections associated with particular subscribers (FIG. 4), for example as data relating to particular features usable by particular subscribers.

The present invention is not limited to the particular features described, but can be used for any feature in which subscribers are to be identified as called or calling parties, or potential called or calling parties, or in which information related to parties which fulfill roles is to be retrieved.

As an example, the term "role" can be construed as "expert". This can be used in a help desk like environment where the role of expert in a particular area can change. This function can be used instead of traditional hunt groups.

A person understanding this invention may now conceive of alternative structures and embodiments or variations of the above. All of those which fall within the scope of the claims appended hereto are considered to be part of the present invention.

We claim:

1. A method of routing calls, messages or information in a communication system comprising:

(a) storing in a memory a database representing a plurality of relationships of organization roles, including names of first persons filling said roles, names of temporary persons to fill at least some specific ones of said roles, directory numbers associated with respective ones of said first and temporary persons, and call features associated with respective specific ones of said roles, (b) in response to a request to complete a call to a particular directory number associated with one of said specific roles, looking up in said database an alternative directory number of a temporary person associated with said one of said specific roles, and (c) processing said call to said alternate directory number instead of to said particular directory number, but with call features associated with said specific role.

2. A method as defined in claim 1 including storing in the database a feature in association with one of said first persons, and processing said call to said alternate directory number in a manner modified by said feature.

3. A method as defined in claim 2 in which said feature is call screening including a list of calling roles for which incoming calls are allowed to be completed to a particular person, and processing an incoming call by receiving a signal identifying a calling person, looking up a role associated with the calling person in the database, retrieving said call screening including said list of persons associated with roles for which incoming calls are allowed to ring said particular person, and completing the call in the event that the role associated with the calling person is on said list.

4. A method as defined in claim 3 including completing the call to another person in the event the calling person is not on the list.

5. A method as defined in claim 1 in which said feature is directory retrieval, including in said organization chart a list of directory numbers of a group of persons filling a particular role, and processing an outgoing call by looking up said role in the database, and retrieving each of the directory numbers in said list, and dialing at least one of the retrieved directory numbers.

6. A method as defined in claim 5 in which said feature is directory retrieval, in which the database includes a list of directory numbers of members of a group filling a particular role, and further including the steps of processing an outgoing call by looking up said role in the database, and retrieving each of the directory numbers in said list, and forwarding an electronic mail message to each member of the group using the retrieved directory numbers in said list.

7. A method as defined in claim 1 in which one of said specific features is special access, storing an alternate special access directory number in association with a particular role, and processing an outgoing call by looking up the role associated with a particular dialed directory number, retrieving said alternate special access directory number associated with the role and dialing the outgoing call with said alternate special access directory number in place of said particular dialed directory number.

8. A method as defined in claim 1, in which one of said specific features is call forwarding, and including the steps of storing in the database a number associated with a particular role, receiving an incoming call, looking up said number associated with said particular role and forwarding said incoming call to said number associated with said particular role.

9. A method as defined in claim 8 including modifying the number associated with said particular role and forwarding said incoming call to the modified number.

10. A method as defined in claim 1 including associating the database with a switching system and completing the call to a person connected to the switching system.

* * * * *